United States Patent [19]

Naruse

[11] Patent Number: 5,480,350

[45] Date of Patent: Jan. 2, 1996

[54] AUTOMOBILE VENTILATOR LOUVER

[76] Inventor: Rikihei Naruse, c/o Suzuki Motor Corporation, 300, Takatsuka-cho, Hamamatsu-shi, Shizuoka-ken, Japan

[21] Appl. No.: 365,281

[22] Filed: Dec. 28, 1994

[30] Foreign Application Priority Data

Mar. 2, 1994 [JP] Japan .................... 6-031742

[51] Int. Cl.⁶ .................................. B60H 1/34
[52] U.S. Cl. ........................... 454/155; 454/315
[58] Field of Search ..................... 454/155, 315

[56] References Cited

U.S. PATENT DOCUMENTS 4,796,518  1/1989  Murray .................... 454/155

5,230,655  7/1993  Thompson et al. .......... 454/315 X

FOREIGN PATENT DOCUMENTS 190351    8/1987   Japan .................... 454/155
2-28038   2/1990   Japan .
2232760  12/1990   United Kingdom ........... 454/155

*Primary Examiner*—Harold Joyce

[57] ABSTRACT

An automobile ventilator louver including a plurality of fins which are provided in a ventilator case so as to be turned in association with each other, and a control knob provided on a middle fin to turn the plural fins, wherein an engagement portion 901, 902, which engages with the rear end of the adjacent fin 3 when the control knob 7 is turned to a predetermined angle, is provided at the rear end of the control knob 7.

3 Claims, 9 Drawing Sheets

AUTOMOBILE VENTILATOR LOUVER

FIELD OF THE INVENTION AND RELATED ART STATEMENT

The present invention relates to an automobile ventilator louver in which the rotation of a control knob for changing the directions of fins is controlled by using fins at both sides.

The driver's seat of a motor vehicle is provided with an air outlet of air conditioner to provide air conditioning in the cabin. As shown in FIG. 10, an instrument panel 100 of the driver's seat has an air outlet for defroster 102, an air outlet for side demister 103, air outlets for ventilation 104 and 105, and an air outlet for heater (not shown) as air outlets from an air conditioning duct 101. The air outlet for ventilation 104 is arranged at the center of the driver's seat, while the air outlet 105 is arranged at both sides of the driver's seat. Ventilator louvers 106 and 107 for controlling wind direction are connected to the air outlets 104 and 105, respectively, so that wind direction can be changed by controlling the directions of vertical and horizontal fins.

FIGS. 11 and 12 show a conventional ventilator louver.

This ventilator louver 108 has a plurality of front fins 109 which are arranged horizontally at fixed intervals in a case 110. The front fin is supported by an axis 111, which is pivotally mounted to the wall surface of the case 110. The rear portion of the front fin 109 is connected to a connecting rod 112, so that the directions of front fins can be changed simultaneously by the operation of a control knob 113. The rear portion of the control knob 113 is attached to the axis 111 of one front fin 109 so that the front fins 109 are rotated together by the turning operation of the control knob 113.

When the directions of the front fins 109 are changed to the right or left by turning the control knob 113 to the right or left, the turning angle of the front fin 109 has so far been controlled by abutting a holding portion 114 of the control knob 113 against the tip end of the adjacent front fin 109.

However, with such a prior art, in which when the control knob 113 is turned, the holding portion 114 of the control knob 113 abuts against the front portion of the front fin 109, by which the turning angle of the front fin 109 is controlled, the holding portion 114 of the control knob must be made large as shown in FIG. 13 to increase the control angle. Also, the holding portion 114 hits the front fin 109, so that the front portion of the front fin 109 is prone to be damaged. (The related prior art is disclosed in Japanese Utility Model Laid-Open No. 2-28038.)

OBJECT AND SUMMARY OF THE INVENTION

The present invention was made to solve the above problems. Accordingly, an object of the present invention is to provide an automobile ventilator louver in which the shape of the control knob is made flexible and the control angle of the control knob can easily be set by controlling the rotation of the control knob for changing the directions of the fins.

To solve the above problems, the present invention provides an automobile ventilator louver including a plurality of fins which are provided in a ventilator case so as to be turned in association with each other, and a control knob provided on a middle fin to turn the plural fins, wherein an engagement portion, which engages with the rear end of the adjacent fin when the control knob is turned to a predetermined angle, is provided at the rear end of the control knob.

Also, the present invention provides an automobile ventilator louver including a plurality of front fins and a plurality of rear fins which are provided in a ventilator case at right angles to each other so as to be rotatable around respective rotation axes, and a control knob which turns the front and rear fins, wherein the control knob is provided on one of the front fins so as to be slidable in the axial direction of the front fin, the rear end of the control knob is engaged with one of the rear fins, the rear fins are turned by sliding the control knob along the front fin, the front fins are turned by turning the control knob, and an engagement portion, which controls the turning angle of the control knob by engaging with the rear end of the adjacent front fin when the control knob is turned, is formed at the rear end of the control knob.

Further, the present invention provides an automobile ventilator louver having a pair of fan-shaped portions which are provided at the rear end of a control knob so as to be opposed to the upper and lower surfaces of a rear fin, and engagement portions which are provided on both sides of the fan-shaped portions to be engaged with the rear end of the adjacent front fin when the control knob is turned to a predetermined angle.

According to the present invention, when the control knob is turned, the direction of the control knob changes together with the front fins with the rotation axis being the center. At this time, the engagement portion of the control knob engages with the rear end of the adjacent front fin, so that the turning angle of the control knob is controlled.

The automobile ventilator louver of the present invention offers the effects as described below.

In an automobile ventilator louver including a plurality of fins which are provided in a ventilator case so as to be turned in association with each other, and a control knob provided on a middle fin to turn the plural fins, an engagement portion, which engaged with the rear end of the adjacent fin when the control knob is turned to a predetermined angle, is provided at the rear end of the control knob. Therefore, the rotation of the control knob for changing the directions of fins can be controlled by the fins at both sides, so that the shape of the control knob is made flexible, and the control angle of the control knob can be set easily. Also, since the engagement portion of the control knob is invisible from the front, any flaw on the control knob cannot be seen from the outside. Therefore, the appearance can be improved.

Further, in an automobile ventilator louver including a plurality of front fins and a plurality of rear fins which are provided in a ventilator case at right angles to each other so as to be rotatable around respective rotation axes, and a control knob which turns the front and rear fins, the control knob is provided on one of the front fins so as to be slidable in the axial direction of the front fin, the rear end of the control knob is engaged with one of the rear fins, the rear fins are turned by sliding the control knob along the front fin, the front fins are turned by turning the control knob, and an engagement portion, which controls the turning angle of the control knob by engaging with the rear end of the adjacent front fin when the control knob is turned, is formed at the rear end of the control knob. Therefore, the rotation of the control knob for changing the directions of fins can be controlled by the fins at both sides, so that the shape of the control knob is made flexible, and the control angle of the control knob can be set easily. Also, since the engagement portion of the control knob is invisible from the front, any flaw on the control knob cannot be seen from the outside. Therefore, the appearance can be improved.

Still further, a pair of fan-shaped portions are provided at the rear end of a control knob so as to be opposed to the upper and lower surfaces of a rear fin, and engagement portions are provided on both sides of the fan-shaped portions to be engaged with the rear end of the adjacent front fin when the control knob is turned to a predetermined angle. Therefore, the turning angle of the control knob can be changed only by changing the size of the fan-shaped portion. Therefore, the control angle of the control knob can be set arbitrarily.

DETAILED DESCRIPTION OF PREFERRED EMBODIMENTS

One embodiment of the present invention will be described in detail below with reference to the drawings.

Figure 1:
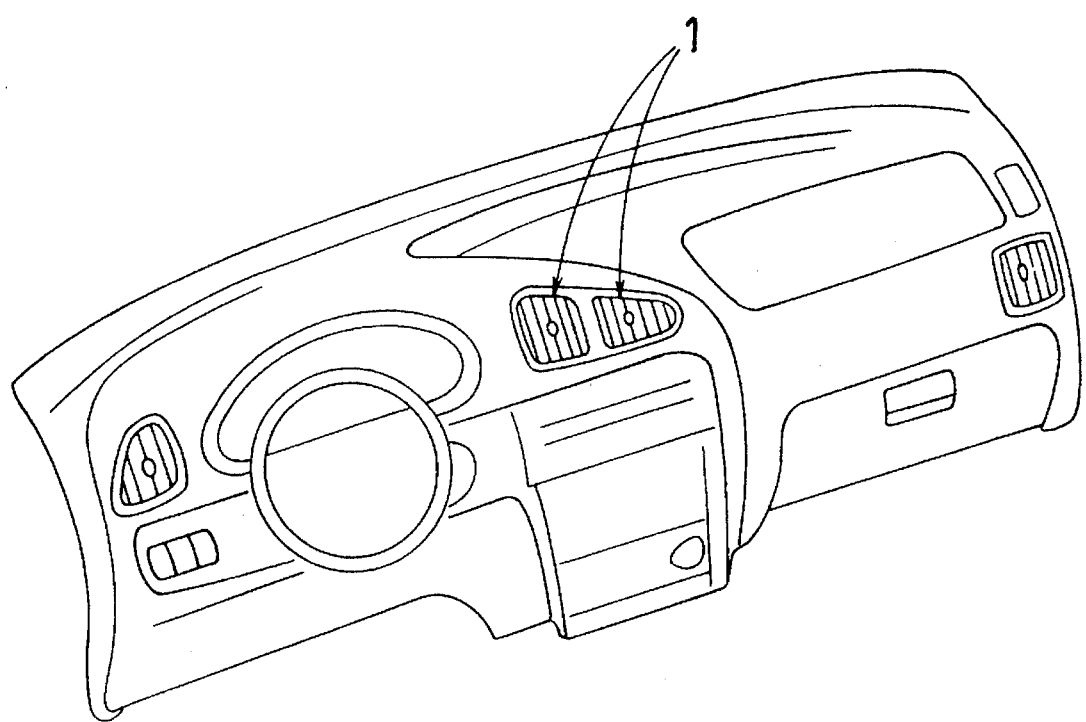
FIG. 1 is a perspective view of an instrument panel.
Figure 2:
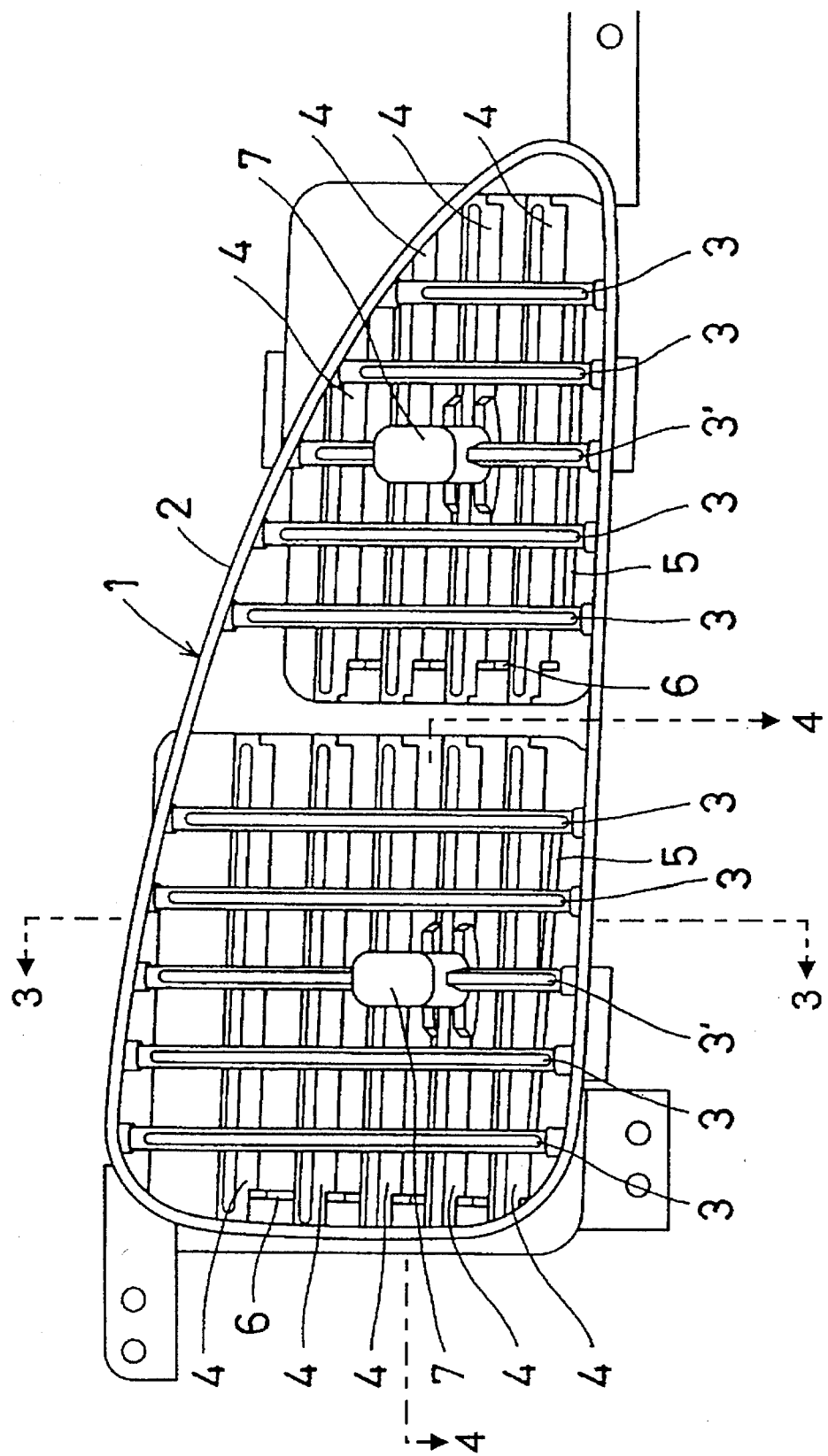
FIG. 2 is a front view of an automobile ventilator louver in accordance with the present invention.
Figure 3:
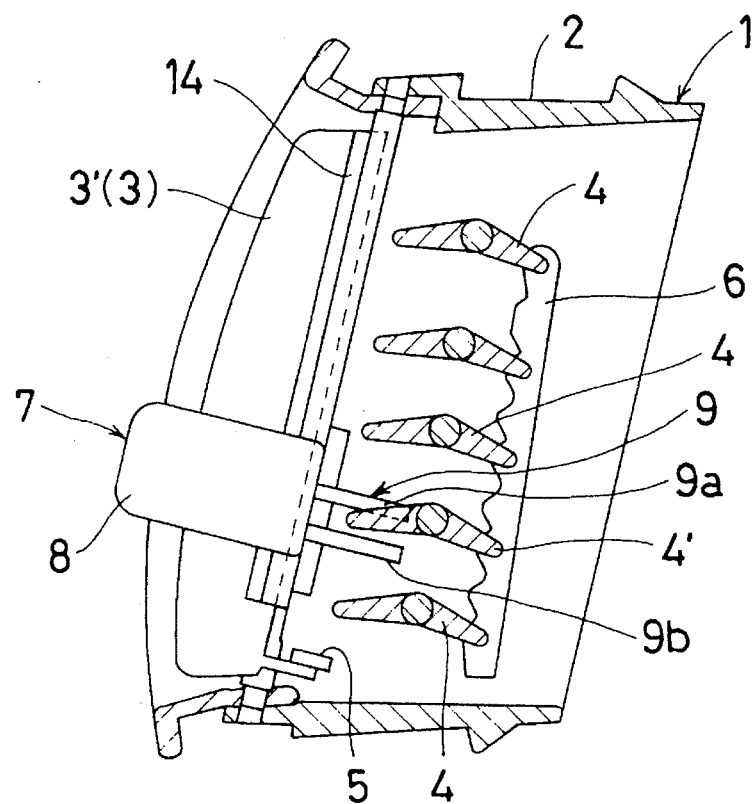
FIG. 3 is a sectional view taken along the line A—A of FIG. 2.
Figure 4:
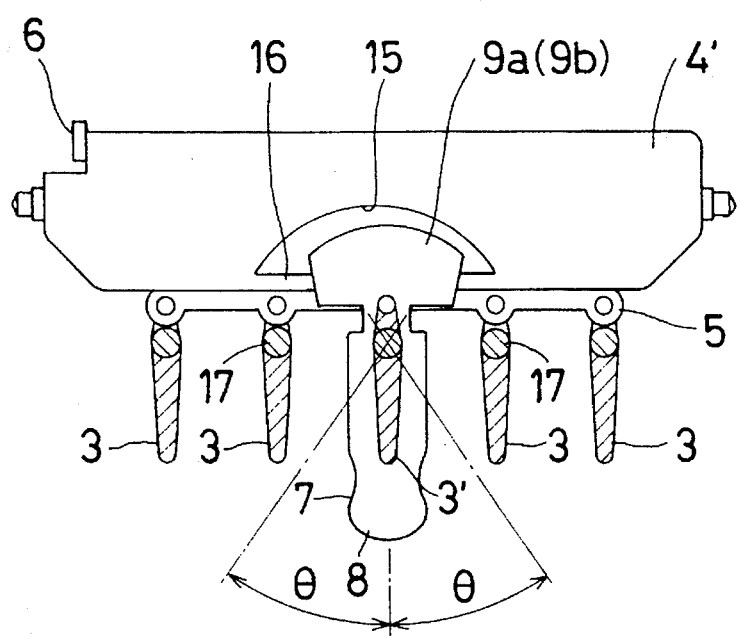
FIG. 4 is a sectional view taken along the line B—B of FIG. 2.

FIG. 1 is a perspective view of an instrument panel, FIG. 2 is a front view of a ventilator louver disposed on the instrument panel, FIG. 3 is a sectional view taken along the line A—A of FIG. 2, and FIG. 4 is a sectional view taken along the line B—B of FIG. 2.

In FIGS. 1 to 4, reference numeral 1 denotes a ventilator louver disposed at a central air outlet of the instrument panel.

This ventilator louver has a plurality of front fins (vertical fins) and a plurality of rear fins (horizontal fins), which are arranged at fixed intervals at right angles to each other and are pivotally mounted to a case 2. The front fins 3 are linked by a connecting rod 5, to which the fins are pivotally mounted, to move together. Similarly, the rear fins 4 are linked by a connecting rod 6.

Figure 5:
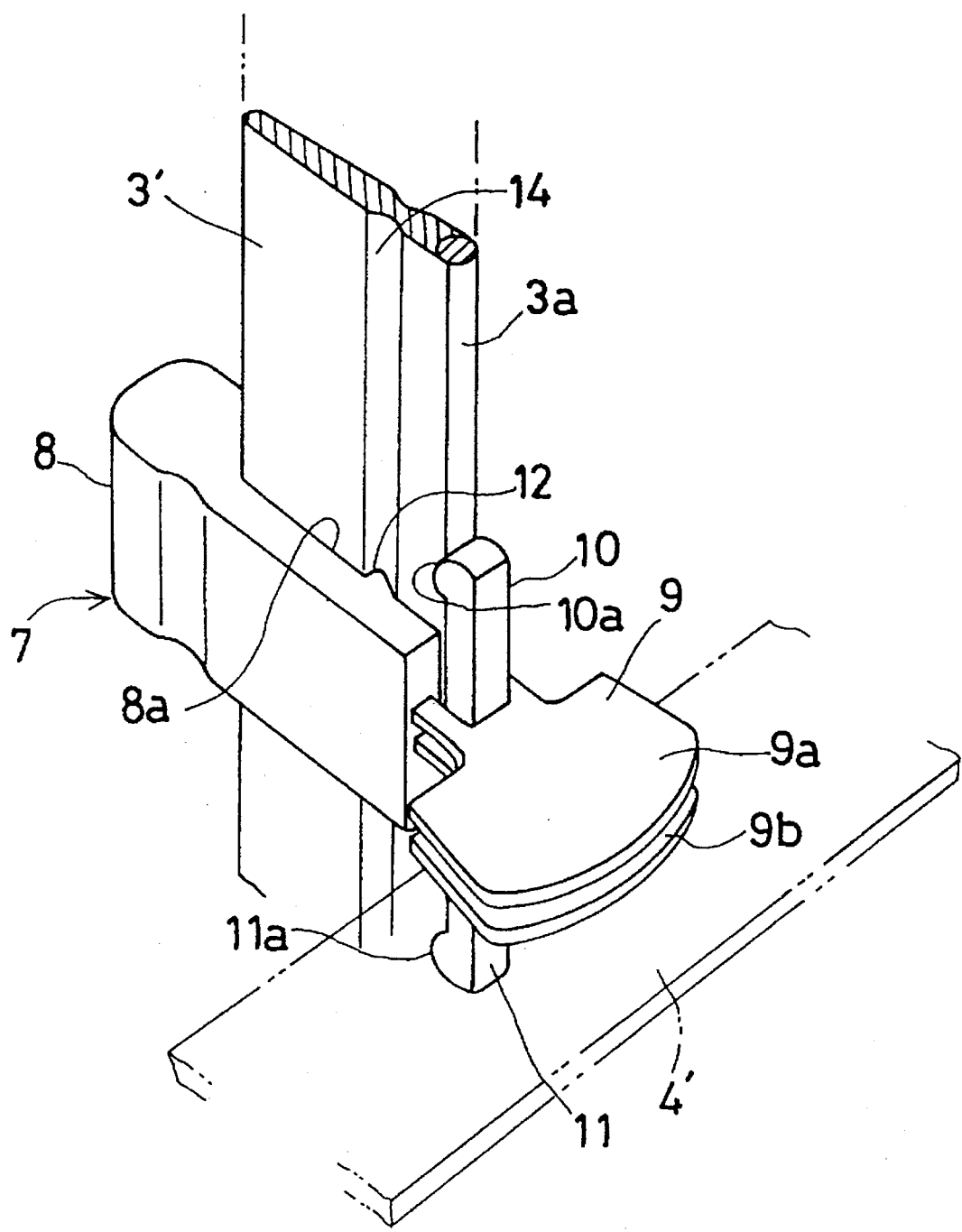
FIG. 5 is a perspective view showing an assembled construction of a control knob and a front fin.
Figure 6:
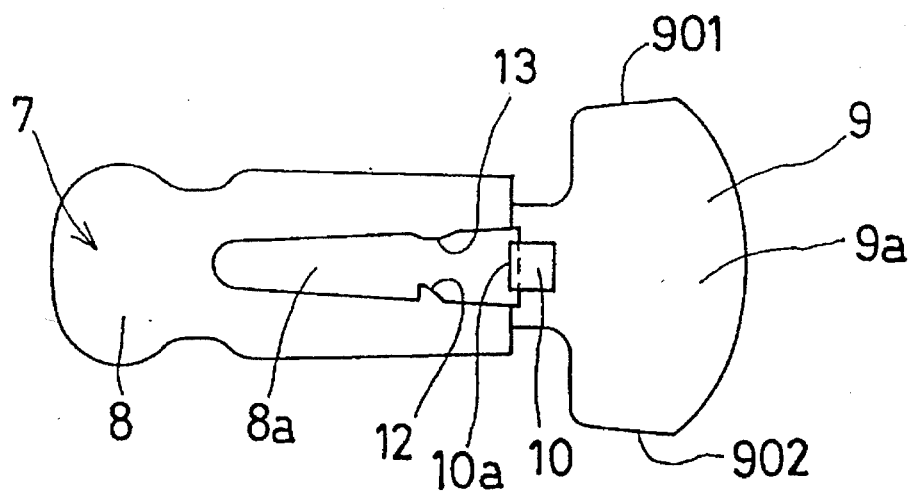
FIG. 6 is a plan view of a control knob.
Figure 7:
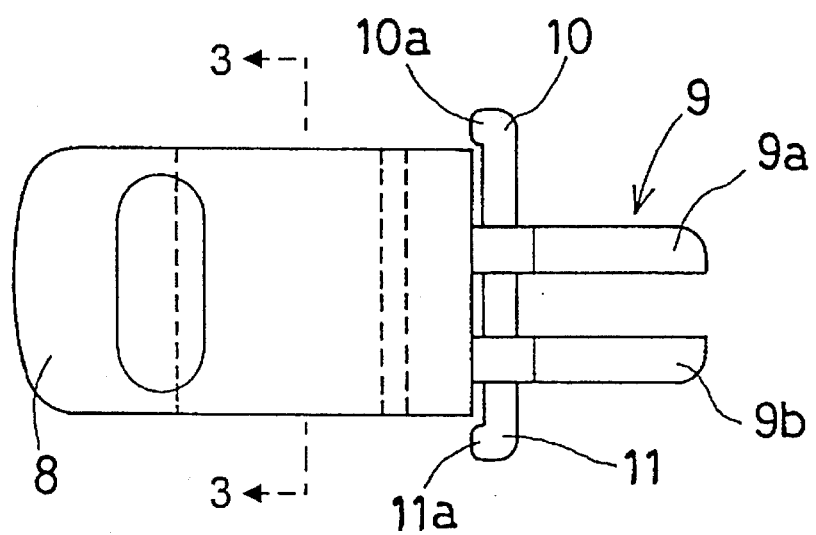
FIG. 7 is a front view of a control knob.

A control knob 7 is slidably mounted to a central front fin 3' as shown in FIGS. 5 to 7. This control knob 7 is composed of a holding portion 8, an engagement portion 9 consisting of two plates (fan-shaped portions) 9a and 9b mounted to the rear end portion of the holding portion 8, and arm portions 10 and 11 extending vertically from the plates 9a and 9b.

The holding portion 8, having a through hole 8a formed vertically, is supported by the front fin 3' by the insertion of the front fin 3' through the through hole 8a. The through hole 8a has a claw portion 12 at one side of the inside surface, and a convex portion 13 at the other side opposite the claw portion 12. The claw portion 12 and the convex portion 13 engage with a slit or a concave side surface 14 formed on the front fin 3', by which the holding portion 8 is attached to the front fin 3'.

The plates 9a and 9b provided at the rear end of the holding portion 8 are arranged so as to hold the upper and lower surfaces of a central rear fin 4'. This rear fin 4' has a semicircular cutout portion (semicircular cutout hole) 15 formed on its plate surface, and an engagement portion 16 for engaging with the plates 9a and 9b is provided at the tip end of the cutout portion 15. The plates 9a and 9b are shaped like a fan, and both of their sides 901 and 902 are formed into inclined faces when viewed vertically. The side 901, 902 engages with the axis portion 17 of the adjacent front fin 3, by which the turning angle θ of the control knob 7 is determined.

At the tip ends of the arm portions 10 and 11, convex portions 10a and 11a are provided, which faces the through hole 8a. The convex portions 10a and 11a elastically abut against the back portion 3a of the front fin 3'. The arm portions 10a and 11a are formed so as to be positioned ahead of the back portion 3a of the front fin 3', so that an elastic force can be obtained by abutting the convex portion 10a against the back portion 3a of the front fin 3'.

Figure 8:
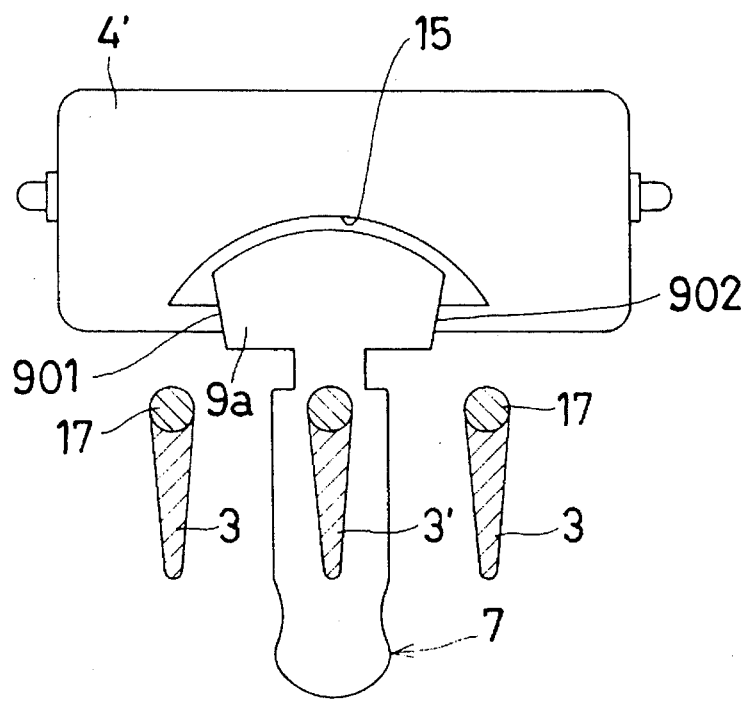
FIG. 8 is a schematic view showing the operation of a control knob.
Figure 9:
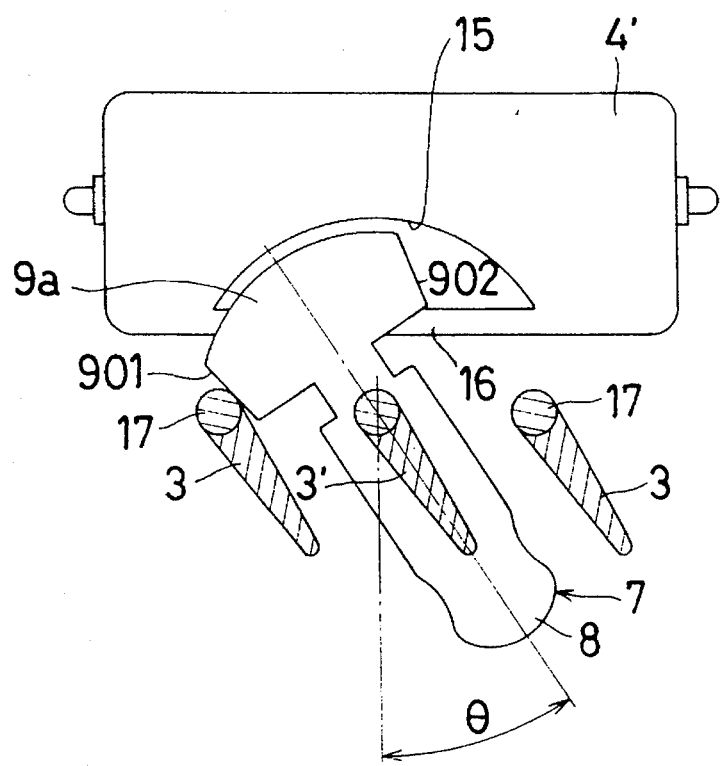
FIG. 9 is a schematic view showing the arm of a control knob and front fins.
Figure 10:
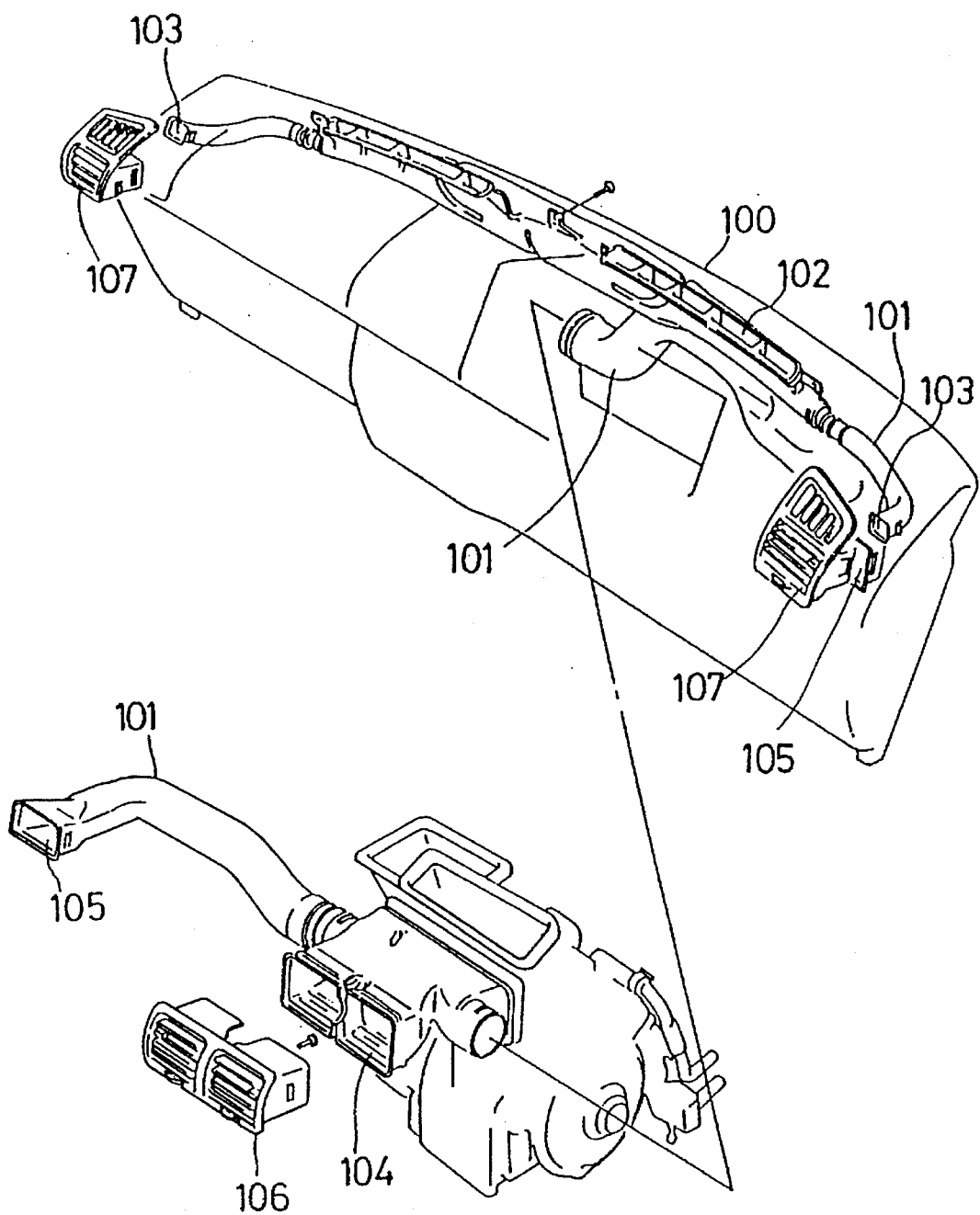
FIG. 10 is a perspective view of air outlets for air conditioning disposed on an instrument panel.
Figure 11:
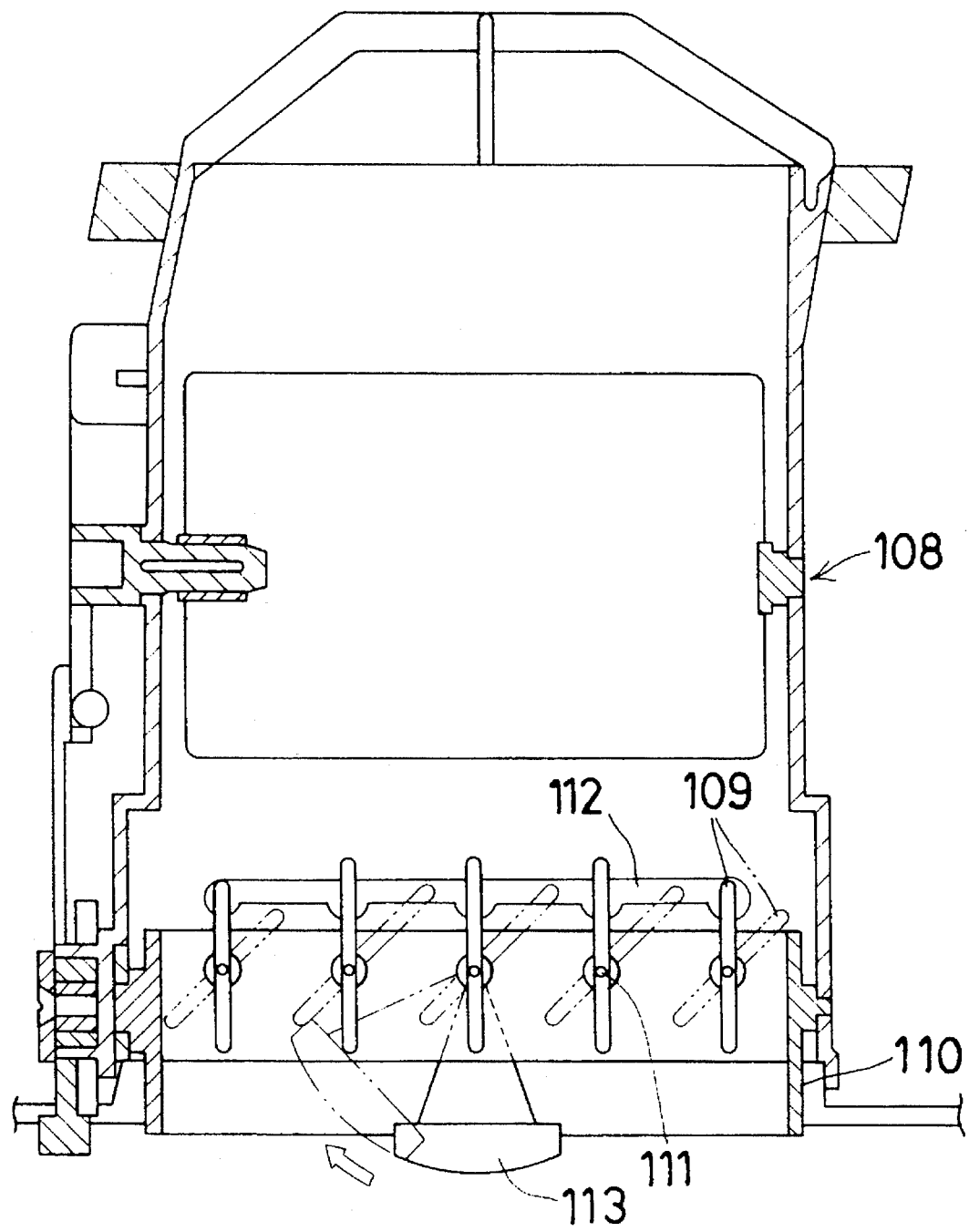
FIG. 11 is a transverse sectional view of a conventional ventilator louver.
Figure 12:
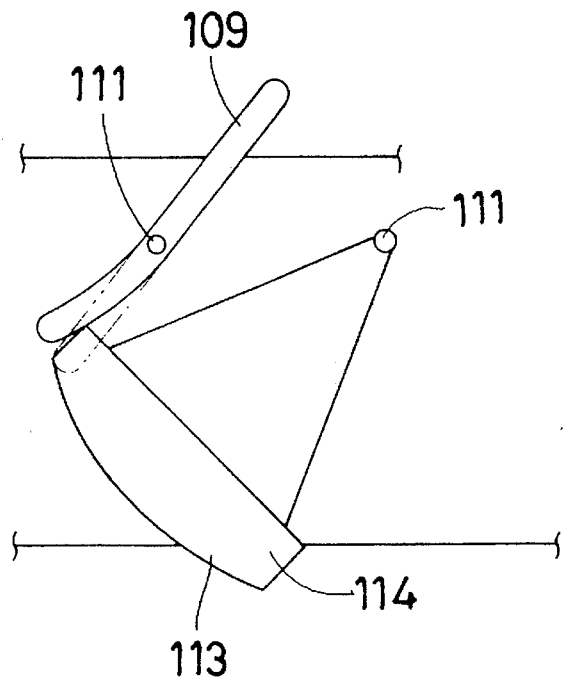
FIG. 12 is a schematic view showing the movement of a control knob and a front fin of a conventional ventilator louver.
Figure 13:
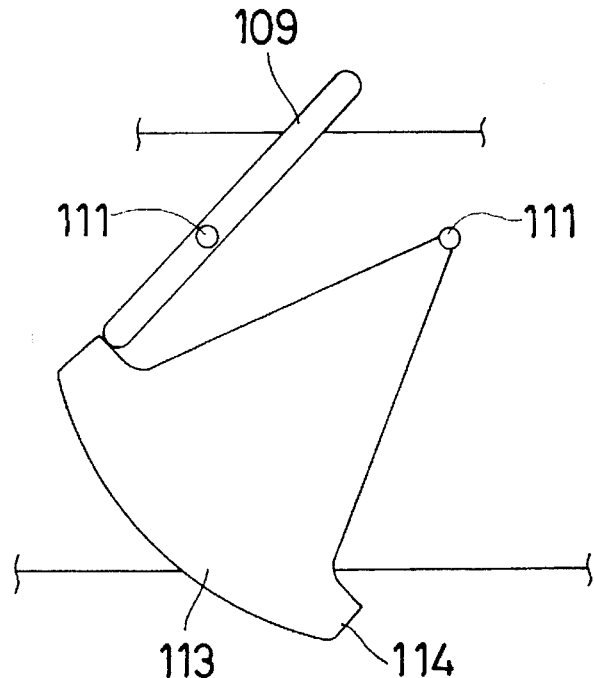
FIG. 13 is a schematic view showing the movement of a conventional control knob.

With the above configuration, as shown in FIGS. 8 and 9, when the control knob 7 is turned to the right or left by holding the holding portion 8, the front fin 3' is turned together with the control knob 7, and other front fins 3 are turned at the same time via the connecting rod 5. At this time, the side 901, 902 of the plates 9a and 9b provided at the rear end of the control knob 7 engages with the axis portion 17 of the front fin 3 adjacent to the front fin 3', so that the rotation of the control knob 7 is controlled.

Next, when the control knob 7 is slid vertically along the front fin 3', the rear fin 4' is turned up or down by the engagement portion 9 via the engagement portion 16.

At this time, since the control knob 7 is elastically abutted against the back portion 3a of the front fin 3' by the arm portions 10 and 11, the movement of the control knob 7 in the longitudinal direction of the front fin 3' is inhibited, so that the control knob 7 is slid without jolting with respect to the front fin 3'.

The above embodiment offers the effects as described below.

Since the side 901, 902 of the plates 9a and 9b provided at the rear end of the control knob 7 engages with the axis portion 17 of the front fin 3 adjacent to the front fin 3' to control the rotation of the control knob 7, the shape of the control knob is made flexible, and the control angle of the control knob can be set easily. Also, since the engagement portion (side 901, 902 of the plates 9a and 9b) of the control knob 7 is invisible from the front, any flaw on the control knob 7 cannot be seen from the outside. Therefore, the appearance can be improved.

Further, the turning angle of the control knob 7 can be changed only by changing the sizes of the plates 9a and 9b. Therefore, the control angle of the control knob 7 can be set arbitrarily.

I claim:

1. An automobile ventilator louver comprising a plurality of fins which are provided in a ventilator case so as to be turned in association with each other, and a control knob provided on a middle fin to turn said plural fins, wherein an engagement portion, which engages with the rear end of the adjacent fin when said control knob is turned to a predetermined angle, is provided at the rear end of said control knob.

2. An automobile ventilator louver comprising a plurality of front fins and a plurality of rear fins which are provided in a ventilator case at right angles to each other so as to be rotatable around respective rotation axes, and a control knob which turns said front and rear fins, wherein said control knob is provided on one of said front fins so as to be slidable in the axial direction of said front fin, the rear end of said control knob is engaged with one of said rear fins, said rear fins are turned by sliding said control knob along said front fin, said front fins are turned by turning said control knob, and an engagement portion, which controls the turning angle of said control knob by engaging with the rear end of the adjacent front fin when said control knob is turned, is formed at the rear end of said control knob.

3. An automobile ventilator louver having a pair of fan-shaped portions which are provided at the rear end of a control knob so as to be opposed to the upper and lower surfaces of a rear fin, and engagement portions which are provided on both sides of said fan-shaped portions to be engaged with the rear end of the adjacent front fin when said control knob is turned to a predetermined angle.

* * * * *